(12) United States Patent
Levin (10) Patent No.: US 7,702,463 B2
(45) Date of Patent: Apr. 20, 2010

(54) SYSTEMS AND METHODS FOR ENHANCING A SEISMIC DATA IMAGE

(75) Inventor: Stewart A. Levin, Centennial, CO (US)

(73) Assignee: Landmark Graphics Corporation, a Halliburton Company, Houston, TX (US)

( * ) Notice: Subject to any disclaimer, the term of this patent is extended or adjusted under 35 U.S.C. 154(b) by 0 days.

(21) Appl. No.: 11/954,596

(22) Filed: Dec. 12, 2007

(65) Prior Publication Data

US 2009/0157322 A1    Jun. 18, 2009

(51) Int. Cl.
*G01V 1/00*    (2006.01)
*G01V 1/28*    (2006.01)

(52) U.S. Cl. ............................. 702/14; 367/7; 367/68; 367/72; 702/17

(58) Field of Classification Search ................... 702/14; 367/7, 68, 72
See application file for complete search history.

(56) References Cited

U.S. PATENT DOCUMENTS

| | | | |
|---|---|---|---|
| 4,359,766 A * | 11/1982 | Waters et al. ................. 367/38 |
| 4,467,461 A | 8/1984 | Rice et al. | |
| 5,056,066 A | 10/1991 | Howard | |
| 5,148,494 A | 9/1992 | Keskes | |
| 5,432,751 A | 7/1995 | Hildebrand | |
| 5,734,384 A | 3/1998 | Yanof | |
| 5,781,194 A | 7/1998 | Ponomarev et al. | |
| 5,838,564 A | 11/1998 | Bahorich | |
| 5,892,732 A | 4/1999 | Gereztenkom | |
| 5,949,424 A | 9/1999 | Cabral et al. | |
| 6,049,759 A | 4/2000 | Etgen | |
| 6,078,869 A | 6/2000 | Gunasekera | |
| 6,138,075 A * | 10/2000 | Yost ............................. 702/14 |
| 6,396,495 B1 | 5/2002 | Parghi et al. | |
| 6,424,464 B1 | 7/2002 | Neff et al. | |
| 6,473,696 B1 | 10/2002 | Onyla et al. | |
| RE38,229 E | 8/2003 | Marfurt et al. | |
| 6,690,820 B2 | 2/2004 | Lees et al. | |
| 6,765,570 B1 | 7/2004 | Cheung et al. | |
| 6,594,585 B1 | 7/2005 | Gereztenkom | |

(Continued)

FOREIGN PATENT DOCUMENTS

WO    WO/00/14574 A1    3/2000

(Continued)

OTHER PUBLICATIONS

Mark, William R. Glanville, R. Steven, Akeley, Kurt, and Kilgard, Mark J.; Cg: A System for Programming Graphics Hardware in a C-like Language; Siggraph 2003; pp. 896-907.

(Continued)

*Primary Examiner*—Eliseo Ramos Feliciano
*Assistant Examiner*—Janet L Suglo
(74) *Attorney, Agent, or Firm*—Crain Caton & James (57) ABSTRACT

Systems and methods for enhancing the resolution of a seismic data image displayed on a face of a sampling probe. The enhanced image represents a maximum resolution of at least a portion of the seismic data image. The seismic data image is enhanced by extracting seismic data that are perpendicular to a reflection surface that is closest to a center of the sampling probe and positioning the extracted seismic data in a visible planar face of the sampling probe.

24 Claims, 5 Drawing Sheets

U.S. PATENT DOCUMENTS

| | | | |
|---|---|---|---|
| 6,940,507 | B2 | 9/2005 | Repin et al. |
| 6,987,878 | B2 | 1/2006 | Lees et al. |
| 7,006,085 | B1 | 2/2006 | Acosta et al. |
| 7,013,218 | B2 | 3/2006 | Baker, III et al. |
| 7,076,735 | B2 | 7/2006 | Callegari |
| 7,098,908 | B2 | 8/2006 | Acosta et al. |
| 7,102,647 | B2 | 9/2006 | Sloan et al. |
| 7,170,530 | B2 | 1/2007 | Cui et al. |
| 7,218,331 | B2 | 5/2007 | Huang et al. |
| 7,248,258 | B2 | 7/2007 | Acosta et al. |
| 2002/0022930 | A1* | 2/2002 | Bouts et al. .................... 702/14 |
| 2002/0172401 | A1 | 11/2002 | Lees et al. |
| 2003/0025692 | A1 | 2/2003 | Lu et al. |
| 2004/0081353 | A1 | 4/2004 | Lees et al. |
| 2004/0174357 | A1 | 9/2004 | Cheung et al. |
| 2004/0227772 | A1 | 11/2004 | Huang et al. |
| 2005/0237334 | A1 | 10/2005 | Chuter |
| 2006/0206562 | A1 | 9/2006 | Callegari |
| 2008/0024512 | A1 | 1/2008 | Chuter et al. |
| 2008/0059074 | A1 | 3/2008 | Wei et al. |

FOREIGN PATENT DOCUMENTS

| | | |
|---|---|---|
| WO | WO/02/29445 A1 | 4/2002 |

OTHER PUBLICATIONS

Manssour, Isabel H., Furuie, Sergio S. Olabarriage, Silvia D., and Freitas, Carla M.D.S.; Visualizing Inner Structures in Multimodel Volume Data; XV Brazilian Symposium on Computer Graphics and Image Processing (SIBGRAPI'02); 2002; pp. 51-59.

Lees, Jack, "Constructing Faults from Seed Picks by Voxel Tracking", The Leading Edge, Mar. 1999; v. 18; No. 3; p. 338.

Texaco E&P Center Allows Visual Probe of 3D Data Volumes, Oil & Gas Journal, Jun. 1, 1998, pp. 46-47, copied as one page.

Kilgard, Mark J., "A Practical and Robust Bump-Mapping Technique for today's GPUs", NVIDIA Corporation, Santa Clara, CA, Jul. 5, 2000, pp. 1-39.

Brown, Alistair R., "Interpretation of Three-Dimensional Seismic Data"; AAPG Memoir 42; Dec. 1999 pp. 19, 233, 5th Edition; American Association of Petroleum Geologists.

Foley, James et al, Computer Graphics: Principles and Practice (2nd ed.), 1990, p. 838, Boston, Massachusetts, USA.

"VoxelGeo Consortium Meeting Summary," CogniSeis Development, Jun. 13, 1996, 2 pages.

James, Huw, Peloso, Andy and Wang, Joanne; Volume Interpretation of Multi-Attribute 3D Surveys; First Break; Mar. 2002, pp. 176-179; vol. 20:3; Eage.

Christie, Murray; Thinking Inside the Box; CSEG Recorder; Jun. 2002; pp. 50-57.

Ching-Rong Lin, R. Bowen Loftin, and H. Roice Nelson, Jr., Interaction with Geoscience Data in an Immersive Environment, Virtual Reality, 2000, pp. 55-62.

Ching-Rong Lin and R. Bowen Loftin, Application of Virtual Reality in the Interpretation of Geoscience Data, Proceedings of the ACM Symposium on Virtual Reality Software and Technology, 1998, pp. 187-194.

VoxelGeo, Paradigm Geophysical Broadband Solutions in Depth, Mar. 27, 1998, 5 pages, printed from Cogniseis website www.cogniseis.com/voxelgeo.htm.

Holden, Paul, VoxelGeo 1.1.1: Productivity Tool for the Geosciences, Release Notes (1994) & User's Guide (Rev. Mar. 1994), Vital Images, Inc., pp. 1-461.

Cai, Wenli and Sakas, Georgios, Data Intermixing and Multi-Volume Rendering; Eurographics '99; 1999; pp. 359-368; vol. 18, No. 3; Blackwell Publishers, Oxford, UK and Malden, MA.

Neider, Jackie, Davis, Tom, and Woo, Mason; OpenGL Programming Guide; 1994; pp. 422-427; 3rd Edition; Multitexturing; Silicon Graphics, Inc.; Addison-Wesley Professional.

Does Your 3D Interpretation Software Move As Fast As You Do? GeoProbe Does Magic Earth Brochure, Sep. 1999.

Rost, R., The Open GL Shading Language, 2.1 Introduction to OpenGL Shading Language; 2.2 Why Write Shaders?; 2.3 OpenGL Programmable Processors; Chapter 2, pp. 33-36, Feb. 14, 2004.

Goldman, J and T.M. Roy, "The Cosmic Worm," IEEE Computer Graphics and Applications, vol. 14, Issue 4, Jul 1994, pp. 12-14.

Achenbach, S., et al., "Curved Multiplanar Reconstructions for the Evaluation of Contrast-Enhanced Electron Beam CT of the Coronary Arteries", American Journal of Roentgenology, Apr. 1998, pp. 895-899, vol. 170, No. 4, Baltimore, MD, US.

Levin, Stewart A.; Resolution in Seismic Imaging: Is it all a Matter of Perspective?; Geophysics 63(2); Mar.-Apr. 1998; pp. 743-749; vol. 63, No. 2; USA.

Sheriff, R.E.; Encyclopedic Dictionary of Applied Geophysics; 2002; 4th Ed.; Society of Exploration Geophysicists; Tulsa, Oklahoma.

Taner, M. Turhan, Cook, Ernest E. and Neidell, Norman S.; Paleo Seismic and Color Acoustic Impedance Sections: Applications of Downward Continuation in Structural and Stratigraphic Context; 1982; pp. 110-111; Expanded Abstract S8.7, 52nd Annual Meeting of the Society of Exploration Geophysicists; Dallas, Texas.

Yilmaz, Oz. and Lucas, Darran; Prestack Layer Replacement; Geophysics 51(7); Jul. 1986; pp. 1355-1369; vol. 51, No. 7; USA.

Computing, Mechanical Engineering Magazine, Oct. 1996, 9 pgs., The American Society of Mechanical Engineers.

OpenWorks Sections, 2004, 12 pages.

Robler, Friedemann, Tejada, Eduadro, Fangmeier, Thomas, Ertl, Thomas, & Knauff, Markus; "GPU-Based Multi-Volume Rendering for the Visualization of Function Brain Images"; 14 pages, 2006.

Lacroute, "Fast Volume Rendering Using a Shear-Warp Factorization of the Viewing Transformation", Doctoral dissertation submitted to Departments of Electrical Engineering and Computer Science Stanford University, Sep. 1995, 236 pages, Stanford University Stanford, CA, USA.

Ney, Fishman, "Editing Tools for 3D Medical Imaging," IEEE Computer Graphics & Applications, Nov. 1991, pp. 63-71, vol. 11 issue 6, IEEE Computer Society Press, Los Alamitos, CA, U.S.A.

Durkin, Hughes, "Nonpolygonal Isosurface Rendering for Large Volume Datasets", "Proceedings of the conference on Visualization '94", 1994, pp. 293-300, IEEE Computer Society Press, Los Alamitos, CA, U.S.A.

Lin, Jim Ching-Rong; "Geoscience Visualization with GPU Programming" SPEI Visualization and Data Analysis; 2005; 9 pages, Houston, TX.

Castanie, Lurent, Levy, Bruno, & Boquet, Fabian; "VolumeExplorer; Roaming Large Volumes To Couple Visualization and Data Processing for Oil & Gas Exploration" Oct. 23-28, 2005; pp. 247-254; Proceedings of the IEEE Visualization; Minneapolis MN.

Lum, Eric B., Wilson, Brett & Ma, Kwan Liu; "High Quality Lighting and Efficient Pre-Integration for Volume Rendering"; Joint Eurographics—IEEE TCVG Symposium on Visualization/TheEurographics Association; 2004; 11 pages.

Castanie, Laurent, Bosquet, Fabien & Levy, Bruno; "Advances in Seismic Interpretation Using new Volume Visualization Techniques" First Break (Special Topic-Reservoir Geoscience/Engineering) Oct. 2005; pp. 69-72; vol. 23 Eage.

Lin, Ching-Rong, Loftin, R. Bowen & Stark, Tracy: Virtual Reality for Geosciences Visualization: Computer Human Interaction; 1998; Proceedings, 3rd Asia Pacific Shonan Village Center; Japan; Jul. 15-17, 1998; pp. 196-201; IEEE Comput. Soc. US, Las Alamitos, CA.

Pommert, Andreas, Hohne, Karl Heinz, Pflesser, Bernhard, Riemer, Martin, Schiemann, Thomas, Schubert, Rainer, Tiede, Ulf & Schumacher, Udo; A Highly Realistic Volume Model Derived From the Visible Human Male; The Third Visible Human Project Conference, Bethesda, Maryland; Oct. 2000; 11 pages.

Oldenzeil, T.; Dithuijzen, Roos Van & Kruijsdijk, Cor Van; Geologic Parameterization of Reservoir Model Enhances History-Match Procedure; The Leading Edge; Jun. 2002; pp. 544-551; vol. 21, No. 6.

Schwab, Matthias; Enhancement of Discontinuities in Seismic 3-D Images Using a Java Estimation Library; Ph.D Thesis/Stanford University/Department of Geophysics, Jun. 2001; 164 Pages.

Cortesi, "REACT Real Time Programmers Guide", Mar. 18, 1997, 187 pages, Silicon Graphics Inc., California, U.S.A.

Lorensen, Cline, "Marching Cubes: A High Resolution 3D Surface Construction Algorithm," Computer Graphics, vol. 21 issue 4, Jul. 1987, pp. 163-169, Association for Computing Machinery, New York, U.S.A.

Bajaj, et al., "Fast Isocontouring for Improved Interactivity", Proc. ACM SIGGRAPH/IEEE Symposium on Volume Visualization (ACM Press, 1996), 12 pages.

Cabral, et al., "Accelerated Volume Rendering and Tomographic Reconstruction Using Texture Mapping Hardware", 1995, pp. 91-98, Association for Computing Machinery, New York, U.S.A.

Cullip Timothy and Neumann Ulrich, "Accelerating Volume Reconstruction with 3D Texture Hardware", 1993, 6 pages, University of North Carolina, Chapel Hill, U.S.A.

Cignoni, Montani, Scopigno, "MagicSphere: an insight tool for 3D data visualization," 1994, pp. 317-328, vol. 13(3), Computer Graphics Forum,The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, pp. 86-99.

Höllerer, Hege, Stallings, "Visualization and 3D-Interaction for Hyperthermia Treatment Planning," 1995, 7 pages, Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization, 1989, pp. 85-92, Association for Computing Machinery, New York, U.S.A.

Kanus, et al, "Implimentations of Cube-4 on the Teramac Custom Computing Machine", "Computers And Graphics", 1997, pp. 199-208, vol. 21, Elsevier, London, U.K.

Kaufman, Bakalash "Memory and Processing Architecture for 3D Voxel-Based Imagery," "IEEE Computer Graphics and Applications", Nov.-Dec. 1988, pp. 10-23, vol. 8 No. 6, IEEE Computer Society, Washington D.C., U.S.A.

Brady, et al, "Crumbs: a virtual environment tracking tool for biological imaging," IEEE Symposium on Frontiers in Biomedical Visualization, 1995, pp. 18-25, 82, IEEE Computer Society, Washington DC, U.S.A.

Fraser Robert, "Interactive Volume Rendering Using Advanced Graphics Architectures," 1994, 8 pages, Silicon Graphics Inc.

Kulic, "Building an OpenGL Volume Renderer" "SGI Development News", 1996, 9 pages.

Serra, et al., "Interactive Vessel Tracing in Volume DATA", 1997, pp. 131-137"Symposium on 3D Grapics", Providence, RI.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

Speray, Kennon, "Volume Probes: Interactive data Exploration on Arbitrary Grids" Computer Graphics, vol. 24 issue 5, Nov. 1990, pp. 5-12, Association for Computing Machinery, New York, U.S.A.

IRIS Universal No. 36, Silicon Graphics Inc., Summer 1996, 96 pages.

Durkin, Hughes, "Nonpolygonal Isosurface Rendering for Large Volume Datasets", "Proceedings of the conference on Visualization '94", 1994, pp. 293-300, IEEE Computer Society Press, Los Alamitos, CA, U.S.A.

Dopkin, Duane & James, HUW "Trends in Visualization for E&P Operations" First Break; Mar. 2006; pp. 55-59; vol. 24 EAGE.

Fernando, Randima and Kilgard, Mark J., CG Toolkit - User's Manual: A Developer's Guide to Programmable Graphics; Sep. 2005; 356 Pages; Release 1/4; NVIDIA; Addison-Wesley.

* cited by examiner

SYSTEMS AND METHODS FOR ENHANCING A SEISMIC DATA IMAGE

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention generally relates to systems and methods for enhancing the resolution of a seismic data image. The seismic data image may be displayed as a two-dimensional or a three-dimensional image of seismic-data traces, sometimes referred to as wiggles or wavelets, at interactive rates using a sampling probe.

BACKGROUND OF THE INVENTION

In the applied sciences, various fields of study require the analysis of two-dimensional or three-dimensional volume data-sets wherein each data-set may have multiple attributes representing different physical properties. An attribute, sometimes referred to as a data value, represents a particular physical property of an object within a defined two-dimensional or three-dimensional space. A data value may, for instance, be an 8-byte data word which includes 256 possible values. The location of an attribute is represented by (x, y, data value) or (x, y, z, data value). If the attribute represents pressure at a particular location, then the attribute location may be expressed as (x, y, z, pressure).

In the medical field, a computerized axial topography (CAT) scanner or magnetic resonance imaging (MRI) device is used to produce a picture or diagnostic image of some specific area of a person's body, typically representing the coordinate and a determined attribute. Normally, each attribute within a predetermined location must be imaged separate and apart from another attribute. For example, one attribute representing temperature at a predetermined location is typically imaged separate from another attribute representing pressure at the same location. Thus, the diagnosis of a particular condition based upon these attributes is limited by the ability to display a single attribute at a predetermined location.

In the field of earth sciences, seismic sounding is used for exploring the subterranean geology of an earth formation. An underground explosion excites seismic waves, similar to low-frequency sound waves that travel below the surface of the earth and are detected by seismographs. The seismographs record the amplitude of seismic waves, both direct and reflected, at a given location for a given time period. Knowing the time and place of the explosion, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency, (e.g., 50 Hz) sound waves are generated by, for example, a pneumatic device that works like a balloon burst. The sounds bounce off rock layers below the sea floor and are picked up by the hydrophones. In either application, subsurface sedimentary structures that trap oil, such as faults and domes are mapped by the reflective waves.

The use of seismic data to analyze subsurface geological structures, such as faults or other stratigraphic features, is relevant to interpreters searching for subsurface mineral and hydrocarbon deposits. Seismic-data traces are the record of the reflection of sonic waves from underground. These traces can be denoted as A(x, y, t), the reflection amplitude of time t at surface location (x, y). A wiggle display is a basic graphic representation for seismic applications, which may be displayed as a two-dimensional or a three-dimensional image. The area of the amplitude above and/or below a given reference amplitude value for a given wiggle can be filled with colors to enhance the wiggle display for interpretation purposes and therefore, make faults and other stratigraphic features revealed by the wiggle display easier to recognize as generally described in U.S. Pat. No. 7,013,218, which is incorporated herein by reference.

The seismic data is collected and processed to produce three-dimensional volume data-sets comprising "voxels" or volume elements, whereby each voxel may be identified by the x, y, z coordinates of one of its eight corners or its center. Each voxel also represents a numeric data value (attribute) associated with some measured or calculated physical property at a particular location. Examples of geological seismic data values include amplitude, phase, frequency, and semblance. Different data values are stored in different three-dimensional volume data-sets, wherein each three-dimensional volume data-set represents a different data value. When multitude data-sets are used, the data value for each of the data-sets may represent a different physical parameter or attribute for the same geographic space. By way of example, a plurality of data-sets could include a seismic volume, a temperature volume and a water-saturation volume. The voxels in the seismic volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location (xo, yo, zo), the seismic amplitude would be contained in the seismic volume, the temperature in the temperature volume and the water-saturation in the water-saturation volume. In order to analyze certain subsurface geological structures, sometimes referred to as "features" or "events," information from different three-dimensional volume data-sets may be separately imaged in order to analyze the feature or event.

The relationship between a typical wiggle or seismic-data trace and a plurality of voxels is described more fully in U.S. Pat. No. 6,690,820 assigned to Landmark Graphics Corporation, which is incorporated herein by reference.

The presence of geologic structure typically distorts the view of stratigraphic detail in the conventional variable area and/or wiggle trace displays of seismic data often used to interpret subsurface geology. Because the trace is vertical, it does not intersect a horizon at right angles, which is the direction of maximum resolution.

Geological interpreters often use palinspastic reconstruction to, at least approximately, reverse geologic time and warp their modern day structural model into a model of the geologic structure as it would have appeared at some past time. Seismic interpreters will sometimes use a seismic paleosection on which some selected horizon is flattened in order to approximately reveal the attitude of deeper structure at the time of deposition of the flattened horizon. In either approach, however, compaction due to overburden and other changes subsequent to deposition are often ignored.

In 1982, a technique known as downward continuation or wave-equation datuming was adapted for horizon flattening in the Society of Exploration Geophysicists Technical Program Expanded Abstracts S8.7 under the title *Paleo Seismic and Color Acoustic Impedance Sections Applications of Downward Continuation in Structural and Stratigraphic Context* by M. Turhan Taner, Ernest E. Cook and Norman S. Neidell. This technique was applied to a stacked seismic section for a more sophisticated, and presumably more accurate, way to generate paleosections than just arbitrarily shifting each individual trace up or down to flatten a selected horizon. This technique was later extended to prestack seismic data in the article *Prestack Layer Replacement* by Oz Yilmaz and Darren Lucas published in Geophysics, Vol. 51, No. 7.

The wave-equation technique, designated as an aid to structural interpreters, also removed waveform distortions due to overburden structure and reflector orientation for the particular target horizon being flattened. The wave-equation technique further recognized that the process could be reiterated by selecting a deeper horizon and redatuming to it from the previously flattened horizon. While the application was to two-dimensional unmigrated seismic data back in that era, that technique can also, in principle, be applied to modern day unmigrated three dimensional data as well. The computational cost of 3D wave equation redatuming is fairly large, however, making it quite unsuitable in general to interactive seismic interpretation when more than a small handful of seismic horizons are of interest. In addition, the need for unmigrated stacked data, while quite common back in 1982, imposes an unnatural requirement in the modern era where interpreters are very often provided time-migrated volumes as their fundamental input data. However attractive wave equation redatuming might be for unravelling the effects of present-day complex overburden and structure, there is a need for methods and processes that are far less computationally intensive and only require a time-migrated input dataset.

In 1998, an article in Geophysics (volume 63, page 743) entitled *Resolution in Seismic Imaging: Is it all a Matter of Perspective?* by Stewart A. Levin rigorously examined the general scientific community perception that, unlike wave equation redatuming, migration inherently distorted and degraded waveforms for all but the simplest horizontal subsurface geometries. Rejecting then conventional wisdom, the author argued that, among other things, stratigraphic resolution in two-dimensional migrated sections is not inherently distorted by subsurface structure, but instead is generally only an artifact of the universal choice of vertical trace display. Indeed, a horizontal trace display reversed the apparent roles of low and high frequency waveform appearance. It is this insight into the true relationship between iterated wave equation redatuming and seismic time migration that is the launching point for the present invention in addressing the need for interactive interpretation of structurally complex migrated images without distortion and degradation of seismic resolution.

SUMMARY

The present invention meets the above needs and overcomes one or more deficiencies in the prior art by providing systems and methods for enhancing the resolution of a seismic data image.

In one embodiment, the present invention includes a method for enhancing the resolution of a seismic data image that comprises i) positioning a sampling probe around seismic data, the seismic data image comprising at least one of the seismic data within the sampling probe and the seismic data intersecting the sampling probe; ii) extracting the seismic data that are perpendicular to a reflection surface that is closest to a center of the sampling probe; iii) positioning the extracted seismic data in a visible planar face of the sampling probe to form an enhanced image of the seismic data image; and iv) displaying the enhanced image.

In another embodiment, the present invention includes a computer readable medium having computer executable instructions for enhancing the resolution of a seismic data image. The instructions are executable to implement i) positioning a sampling probe around seismic data, the seismic data comprising at least one of the seismic data within the sampling probe and the seismic data intersecting the sampling probe; ii) extracting the seismic data that are perpendicular to a reflection surface that is closest to a center of the sampling probe; iii) positioning the extracted seismic data in a visible planar face of the sampling probe to form an enhanced image of the seismic data image; and iv) displaying the enhanced image.

Additional aspects, advantages and embodiments of the invention will become apparent to those skilled in the art from the following description of the various embodiments and related drawings.

BRIEF DESCRIPTION OF THE DRAWINGS

The present invention will be described with reference to the accompanying drawings in which like elements are referenced with like reference numerals, and in which.

DETAILED DESCRIPTION OF THE PREFERRED EMBODIMENTS

The subject matter of the present invention is described with reference to certain preferred embodiments however, is not intended to limit the scope of the invention. The claimed subject matter thus, might also be embodied in other ways to include different steps, or combinations of steps, similar to the ones described herein and other technologies. Although the term "step" may be used herein to describe different elements of methods employed, the term should not be interpreted as implying any particular order among or between various steps herein disclosed unless otherwise expressly limited by the description to a particular order.

In one embodiment, the present invention may be described in the general context of a computer-executable program of instructions, such as program modules, generally referred to as software. The software may include, for example, routines, programs, objects, components, data structures, etc., that perform particular tasks or implement particular abstract data types. The software forms an interface to allow a computer to react according to a source of input. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the internet.

Those skilled in the art will appreciate that the present invention may be implemented in a variety of computer-system configurations including hand-held devices, multi-processor systems, microprocessor-based or programmable-consumer electronics, minicomputers, mainframe computers and the like. Any number of computer-systems and computer networks are therefore, acceptable for use with the present invention. The present invention may be practiced in distributed-computing environments where tasks are performed by remote-processing devices that are linked through a communications network. In a distributed-computing environment, the software may be located in both local and remote computer-storage media including memory storage devices.

The present invention may therefore, be implemented using hardware, software or a combination thereof, in a computer system or other processing system.

Figure 1:
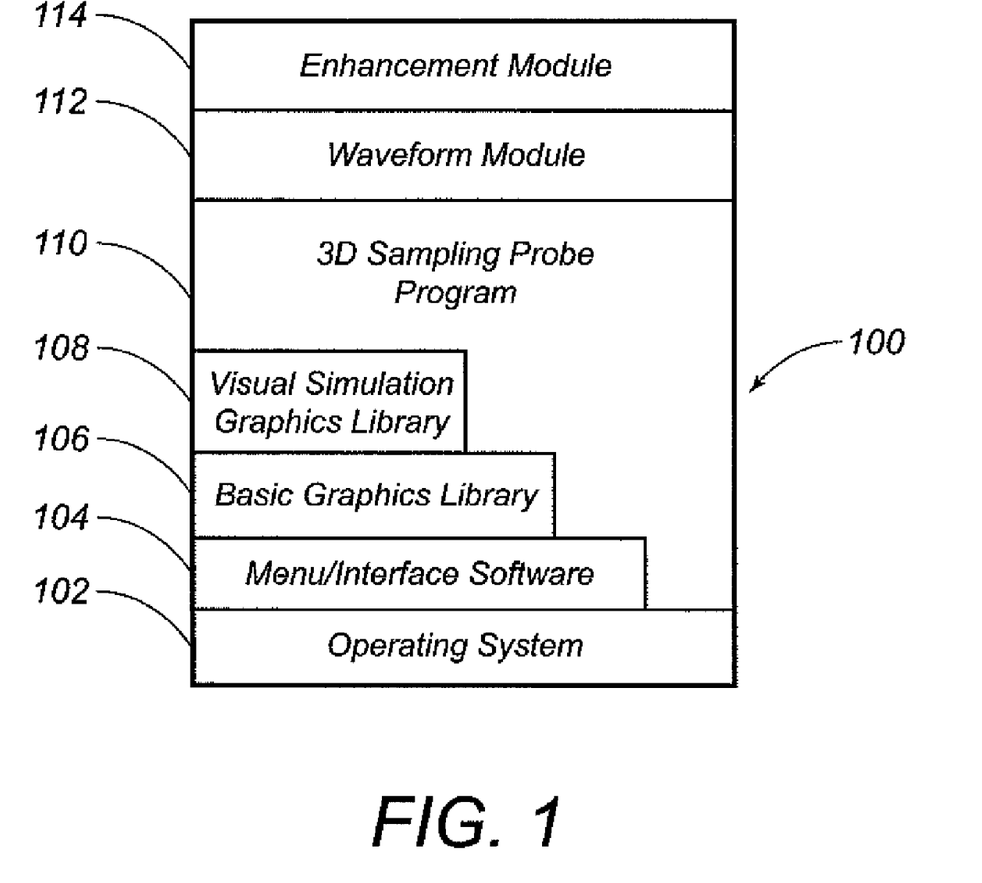
FIG. 1 is a block diagram illustrating one embodiment of a software program for implementing the present invention on a computer system.

FIG. 1 is a block diagram illustrating one embodiment of a software program 100 for implementing the present invention. At the base of the program 100 is an operating system 102. A suitable operating system 102 may include, for example, a Windows® operating system from Microsoft Corporation, or other operating systems as would be apparent to one of skill in the relevant art.

Menu/interface software 104 overlays the operating system 102. The menu/interface software 104 are used to provide various menus and windows to facilitate interaction with the user, and to obtain user input and instructions. As would be readily apparent to one of skill in the relevant art, any number of menu/interface software programs could be used in conjunction with the present invention.

A basic graphics library 106 overlays menu/interface software 104. Basic graphics library 106 is an application programming interface (API) for three-dimensional computer graphics. The functions performed by basic graphics library 106 may include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes and accumulation buffer.

A visual simulation graphics library 108 overlays the basic graphics library 106. The visual simulation graphics library 108 is an API for creating real-time, multi-processed three-dimensional visual simulation graphics applications. As will be understood by those skilled in the art, the visual simulation graphics library 108 may include a suite of tools for two-dimensional and/or three-dimensional seismic data interpretations including, for example, interactive horizon and fault management, three-dimensional visualization and attribute analysis. The visual simulation graphics library 108 therefore, provides functions that bundle together graphics library state control functions such as lighting, materials, texture, and transparency. These functions track state and the creation of display lists that can be rendered later.

Overlaying the elements of program 100 previously described, is a three-dimensional (3D) sampling probe program 110 that interfaces with, and utilizes the functions carried out by, the visual simulation graphics library 108, the basic graphics library 106, the menu/interface software 104 and the operating system 102 in the manner described in U.S. Pat. No. 6,765,570 assigned to Landmark Graphics Corporation, which is incorporated herein by reference. The sampling probe program 110, visual simulation graphics library 108, basic graphics library 106, menu/interface software 104 and operating system 102 are executed on one or more general purpose CPU's as described in the '570 patent. An acceptable CPU may include, for example, processors marketed by Intel® and AMD®.

Overlaying the sampling probe program 110 is a waveform module 112. The waveform module 112 may be written in a procedural language such as, for example, Open GL Shader Language ("GLSL"), which makes it possible to program a Graphics Processing Unit, sometimes referred to as a graphics processor, graphics accelerator or graphics card (hereinafter "GPU"), to achieve visualization effects that are not available using Open GL, marketed by Silicon Graphics, Inc., and the video hardware—i.e., the graphics card. GLSL is well known in the art and is published (ISBN 0-321-19789-5) in "The Open GL Shading Language." The advantages of programming a conventional GPU, instead of a CPU, to execute the waveform module 112 are its large number of registers and its architecture, which enables massive parallelization of the processors. This architecture can process data in the registers in a few GPU cycles—while it may take a few thousand CPU cycles for the same task. GLSL works with individual pixels at (u, v) of the projection plane on a display device. Through GLSL shaders, one can determine how a pixel at (u, v) is illuminated. An acceptable GPU, for example, may include the NVIDIA®G-70 graphics card and a Qudro 5500 graphics port marketed by NVIDIA®. Other GPU's well known in the art may be acceptable if they are capable of executing fragment (pixel) shader programs written with GLSL and support, at a minimum, looping and branching functions.

The waveform module 112 is configured to interface with the sampling probe program 110. The sampling probe program 110 creates a three-dimensional sampling probe in the manner described by the '570 patent, which may comprise a subvolume of a waveform volume. In other words, the sampling probe program 110 extracts a subvolume data set from the waveform volume, which corresponds to a surface of the sampling probe. The waveform module 112 receives the subvolume-data set from the sampling probe program 110 and processes the subvolume-data set using the GPU to draw at least a portion of an image of the sampling probe on a display device as a two-dimensional or a three-dimensional image. The image of the sampling probe therefore, may comprise an intersection of the sampling probe and the waveform volume, or the image may be limited to only an intersection of the sampling probe and the waveform volume.

The waveform module 112 may also be configured to draw at least a portion of an image of the sampling probe on a display device by coloring the subvolume-data set and texture mapping the subvolume-data set onto the surface of the sampling probe. The subvolume-data set may be colored by coloring each seismic-data trace in the subvolume-data set with a preset trace color, color filling each seismic-data trace in the subvolume-data set with a preset positive fill color or a preset negative fill color, and/or coloring a remainder of the subvolume-data set with the preset background color. In addition, the waveform module 112 may be configured to color each seismic-data trace by coloring each pixel on the display device with the preset trace color if the pixel intersects a seismic-data trace in the subvolume-data set. Likewise, the module 112 may be configured to color fill each seismic-data trace by coloring each pixel on the display device with the preset positive fill color if the pixel intersects the subvolume-data set between a seismic-data trace maximum positive amplitude and a seismic-data trace zero amplitude, and coloring each pixel on the display device with the preset negative fill color if the pixel intersects the subvolume-data set between a seismic-data trace maximum negative amplitude and the seismic-data trace zero amplitude. The waveform module 112 may also be configured to color the remainder of the subvolume-data set by coloring each pixel on the display device with the preset background color if the pixel does not intersect a seismic-data trace and does not intersect the subvolume-data set between a seismic-data trace maximum positive amplitude or a seismic-data trace maximum negative amplitude and a seismic-data trace zero amplitude. The image of the sampling probe may be repeatedly drawn in response to movement of the sampling probe within the waveform volume so that as the sampling probe moves through the waveform volume, the image of the sampling probe is redrawn at a rate that is sufficiently fast to be perceived as moving in real time. Exemplary methods enabled by the waveform module 112 are further described in U.S. patent application Ser. No. 11/848,788, which is incorporated herein by reference.

Overlaying the waveform module 112 is an enhancement module 114. The enhancement module 114 may be written in a procedural language such as, for example, GLSL. The enhancement module 114, like the waveform module 112, is written on the GPU. The enhancement module 114 is therefore, configured to interface with the waveform module 112 and sampling probe program 110. The enhancement module 114 interfaces with the waveform module 112 and sampling probe program 110 by receiving and processing seismic data from the waveform module 112 and sampling probe program 110 in the form of a three-dimensional waveform volume and one or more sampling probes. The enhancement module 114 may be configured to extract seismic data from a sampling probe that is perpendicular to a reflection surface that is closest to a center of the sampling probe. The enhancement module 114 may also be configured to position the extracted seismic data in the visible planar face(s) of the sampling probe to form an enhanced image of a seismic data image. Exemplary methods enabled by the enhancement module 114 are further described in reference to FIGS. 2A-2B.

While the present invention is described with reference to processing a three-dimensional volume of seismic-data traces representing a waveform volume, other two-dimensional seismic-data sets may be processed in the same manner. Geoprobe® and PowerView®, which are commercial-software packages marketed by Landmark Graphics Corporation for use in the oil and gas industry, are examples of appropriate interface applications. Geoprobe® is the commercial embodiment of the sampling probe program 110, which may be used to interface with the waveform module 112 and enhancement module 114 to render a three-dimensional image of seismic-data traces in real-time. Alternatively, PowerView® may be used to interface with the waveform module 112 and enhancement module 114 to render a two-dimensional image of seismic-data traces in real-time.

The program 100 illustrated in FIG. 1 may be executed or implemented through the use of a computer system incorporating the program 100 and various hardware components. The system hardware components may include, for example, a processor, memory (e.g., random access memory and/or non-volatile memory devices), one or more input devices, one or more display devices, and one or more interface devices. These hardware components may be interconnected according to a variety of configurations and may include one or more GPU's and CPU's configured in the manner described in the '570 patent. Non-volatile memory devices may include, for example, devices such as tape drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to require digital image data from one or more acquisition devices and/or from one or more remote computers or storage devices through a network. Any variety of acquisition devices may be used depending on the type of object being imaged. The acquisition device(s) may sense various forms of mechanical energy (e.g., acoustic (seismic) energy, displacement and/or stress/strain). Other well known computer system configurations and components that may be used to execute the program 100 are described in the '570 patent.

Each processor (GPU and CPU) may be configured to reprogram instructions and/or data from RAM and/or non-volatile memory devices, and to store computational results into RAM and/or non-volatile memory devices. The program 100 directs each processor to operate on a three-dimensional volume of seismic-data traces and other two-dimensional or three-dimensional seismic data-sets based on the methods described herein.

Figure 2A:
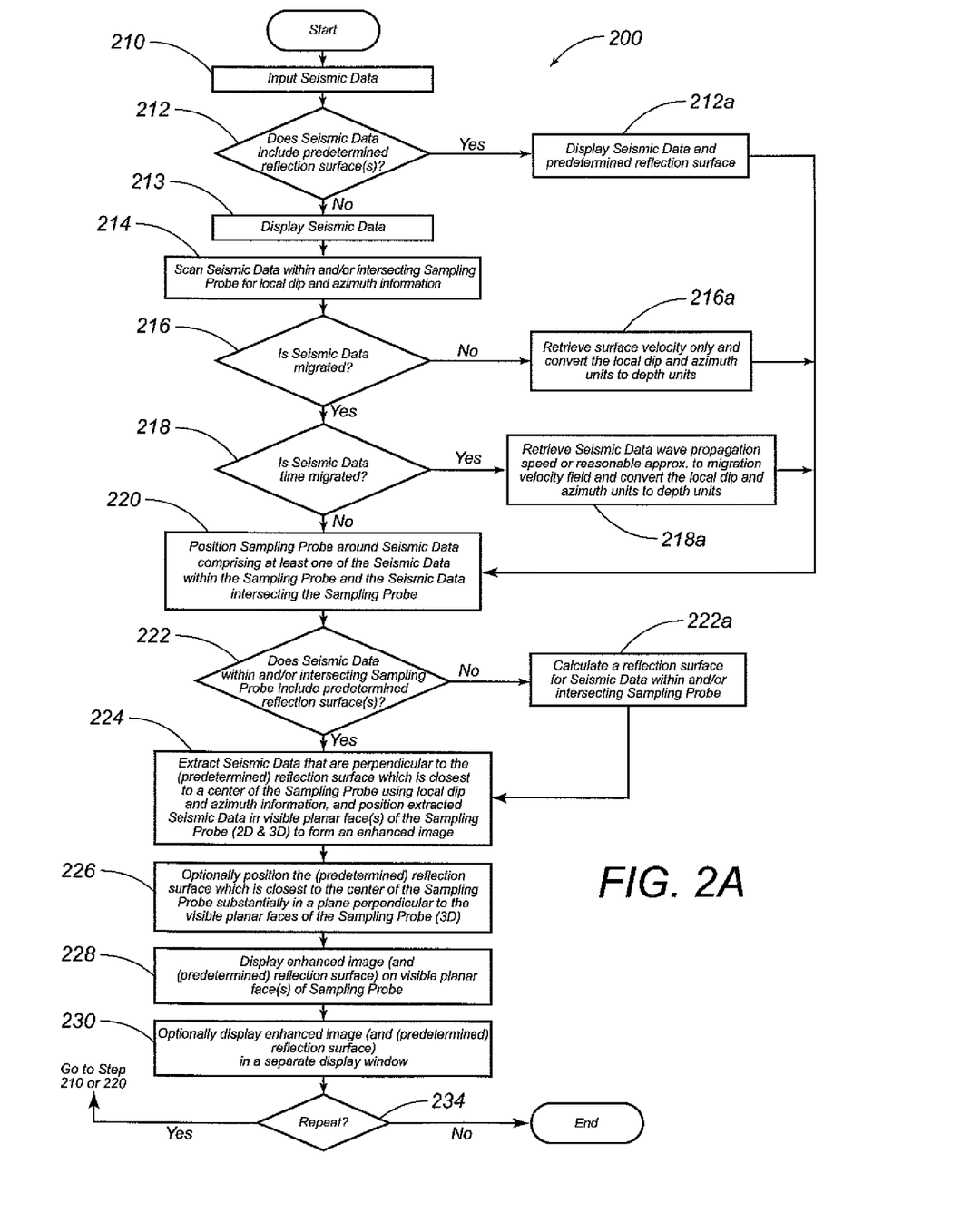
FIG. 2A is a flow diagram illustrating one embodiment of a method for implementing the present invention.

Referring now to FIG. 2A, a flow diagram generally illustrates one embodiment of a method 200 for implementing the present invention. The method begins at step 210 with the input of seismic data from a data source using the graphical user interface tools (menu/interface software 104) described in reference to FIG. 1. The data source may include, for example, a waveform volume comprising geophysical data but may also include other types of seismic data. The data used as input may comprise seismic-data traces in a two-dimensional image or a three-dimensional volume, which may be retrieved directly from the waveform module 112 on the GPU or from some other memory or storage medium within the CPU. The input data may be provided to the computer system through a variety of mechanisms. For example, the input data may be acquired into non-volatile memory and/or RAM using one or more interface devices. As another example, the input data may be supplied to the computer system through a memory medium such as a disc or a tape which is loaded into or onto one of the non-volatile memory devices. In this case, the input data will have been previously recorded onto the memory medium. It is noted that the input data may not necessarily be raw sensor data obtain by an acquisition device. For example, the input data may be the result of one or more processing operations using a set of raw sensor data. The processing operation(s) may be performed by the computer system and/or one or more other computers.

The input data may be stored in a format generally well known in the art and/or described in '570 patent.

In step 212, the seismic data is analyzed to determine if it includes one or more predetermined reflection surfaces using techniques well known in the art. If the seismic data includes at least one predetermined reflection surface, then the seismic data and the predetermined reflection surface may be displayed at step 212a and the method 200 proceeds to step 220. If the seismic data, however, does not include at least one predetermined reflection surface, then the method proceeds to step 213 and only the seismic data may be displayed.

Figure 3:
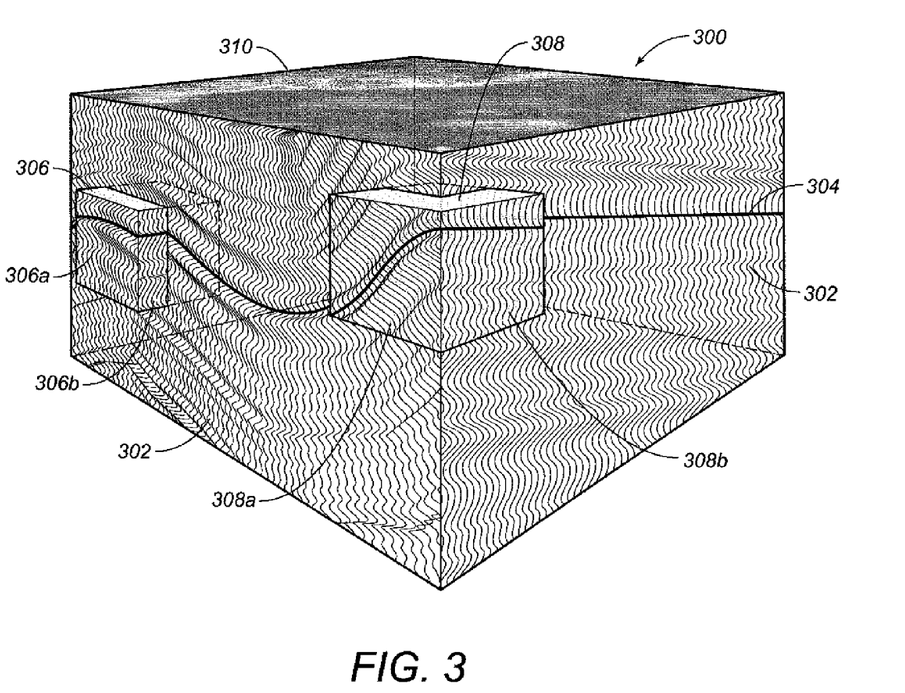
FIG. 3 is a perspective view of a three-dimensional waveform volume illustrating a predetermined reflection surface 304 and two sampling probes 306, 308.

In FIG. 3, the waveform volume 300 and predetermined reflection surface 304 illustrate the result of step 212a in an exemplary display. The reflection surface 304 is a predetermined interpretation of a surface sometimes referred to as a horizon by interpreters of geophysical data. Optionally, the waveform volume 300 may be displayed with one or more sampling probes such as sampling probe 306 and sampling probe 308. The waveform volume 300 may also be completely or partially transparent. As illustrated in FIG. 3, the waveform volume 300 is partially transparent and comprises a plurality of seismic-data traces 302 (wiggles or wavelets) that intersect a large volume 310 and each sampling probe 306, 308. The selective display of a portion of the waveform volume 300, which is represented by volume 310, provides a point of reference for positioning and moving each sampling probe 306, 308 within the waveform volume 300. Alternatively, the waveform volume 300 may be completely transparent while each sampling probe 306, 308 is displayed as an image of only the intersection of the sampling probe and the waveform volume 300.

In step 214, the seismic data is scanned for local dip and azimuth information using techniques well known in the art. Each seismic-data trace in the waveform volume 300, for example, may comprise information confirming at least one of its local dip and its local azimuth.

In step 216, the method 200 determines if the seismic data is migrated using techniques well know in the art. If the seismic data is not migrated, then only the surface velocity is retrieved for each seismic-data trace and the local dip and azimuth units for each seismic-data trace are converted to depth units in step 216a. The method 200 then proceeds to step 220. If the seismic data, however, is migrated, then the method 200 proceeds to step 218 and determines whether the seismic data is time migrated using techniques well known in the art. If the seismic data is not time migrated, then the seismic data is depth migrated and the method 200 proceeds to step 220. If the seismic data, however, is time migrated, then the method 200 proceeds to step 218a.

In step 218a, the seismic data wave propagation speed, or a reasonable approximation to the migration velocity field, is retrieved and the local dip and azimuth units for each seismic-data trace are converted to depth units. The method 200 then proceeds to step 220.

In step 220, a sampling probe is positioned around seismic data comprising at least one of the seismic data within the sampling probe and the seismic data intersecting the sampling probe using the graphical user interface tools (menu/interface software 104) described in reference to FIG. 1. The sampling probe may be two-dimensional or three-dimensional, and may be positioned around a portion of the seismic data and/or predetermined reflection surface displayed at step 212a or 213. The seismic data intersecting the sampling probe may include seismic data within the sampling probe that extends outside of the sampling probe.

In FIG. 3, for example, two sampling probes 306, 308 are used to illustrate the invention although only one may be required. Each sampling probe 306, 308 is three-dimensional and is positioned around a portion of the seismic-data traces 302 and the predetermined reflection surface 304 in the waveform volume 300. The extents of each sampling probe 306, 308 are shown by dashed lines that extend into the volume 310, and the seismic-data traces 302 intersecting each visible planar face 306a, 306b and 308a, 308b, respectively.

Figure 4A:
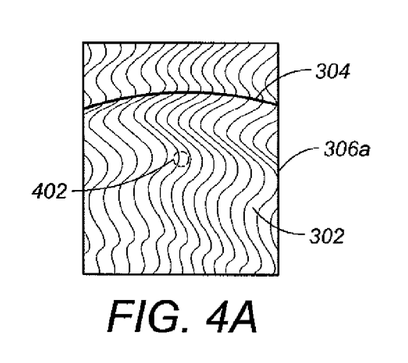
FIG. 4A is a face of the sampling probe 306 illustrated in FIG. 3.
Figure 4B:
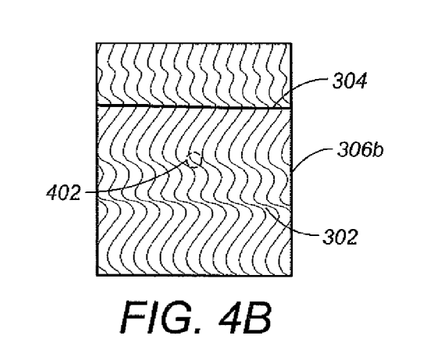
FIG. 4B is another face of the sampling probe 306 illustrated in FIG. 3.

Referring now to FIG. 4A and FIG. 4B, each planar face 306a, 306b of the sampling probe 306 is illustrated, respectively. In FIG. 4A, the predetermined reflection surface 304 and seismic-data traces 302 are illustrated where each intersects the planar face 306a. In FIG. 4B, the predetermined reflection surface 304 and seismic-data traces 302 are illustrated where each intersects the planar face 306b. The sampling probe 306 may also include seismic data traces 302 intersecting the sampling probe 306 within its extents (planar faces), which are not illustrated in FIG. 4A and FIG. 4B, and that may extend outside of sampling probe 306. Likewise, the seismic data traces 302 intersecting each planar face 306a, 306b of sampling probe 306 may also extend beyond each visible planar face 306a, 306b. Because the reflection surface 304 illustrated in FIG. 4B us substantially horizontal, the seismic-data traces 302 illustrated in FIG. 4A and FIG. 4B are substantially perpendicular to the reflection surface 304 that is closest to the center 402 of the sampling probe 306. The seismic-data traces 302 illustrated in FIG. 4A and FIG. 4B therefore, are positioned in each planar face 306a, 306b, respectively, and represent a maximum resolution of the seismic-data traces 302. The seismic data illustrated in FIG. 4A and FIG. 4B may also be referred to as a high resolution stratigraphic image. Quite often, however, the seismic-data traces that are perpendicular to the reflection surface that is closest to the center of a viewing plane or probe do not lie in the same plane as the viewing plane. As a result, additional steps are required to enhance the seismic data image in the viewing plane.

Figure 5A:
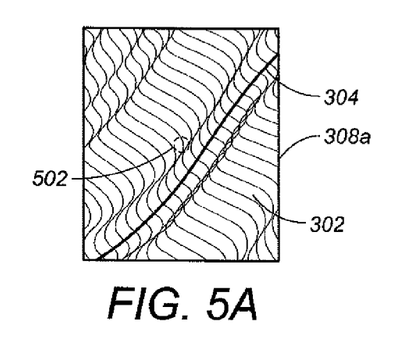
FIG. 5A is a face of the sampling probe 308 illustrated in FIG. 3.
Figure 5B:
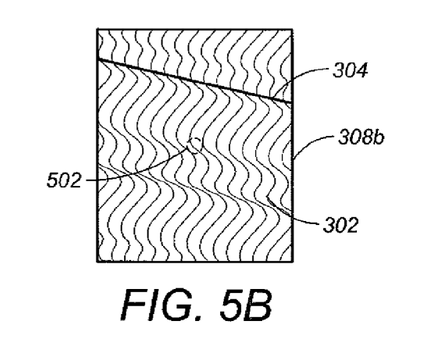
FIG. 5B is another face of the sampling probe 308 illustrated in FIG. 3.
Figure 5C:
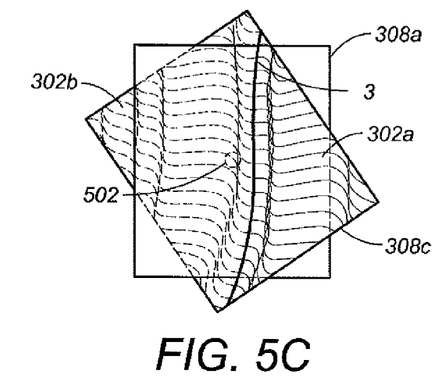
FIG. 5C is an image of the seismic-data traces that intersect the face of the sampling probe 308 that are perpendicular to the predetermined reflection surface 304 illustrated in FIG. 5A.

Referring now to FIGS. 5A and 5B, each planar face 308a, 308b of sampling probe 308 is illustrated, respectively. In FIG. 5A, the predetermined reflection surface 304 and seismic-data traces 302 are illustrated where each intersects the planar face 308a. In FIG. 5B, the predetermined reflection surface 304 and seismic-data traces 302 are illustrated where each intersects the planar face 308b. The sampling probe 308 may also include seismic-data traces 302 intersecting sampling probe 308 within its extents (planar faces), which are not illustrated in FIG. 5A and FIG. 5B, but which are illustrated in FIG. 5C. These seismic-data traces may extend outside of sampling probe 308. Likewise, the seismic-data traces 302 intersecting each planar face 308a, 308b of sampling probe 308 may also extend beyond each visible planar face 308a, 308b. Because the reflection surface 304 illustrated in FIG. 5B is not substantially horizontal, the seismic-data traces 302 illustrated in FIG. 5A are not substantially perpendicular to the reflection surface 304 that is closest to the center 502 of sampling probe 308. In other words, the seismic-data traces 302 that are perpendicular to the reflection surface 304 illustrated in FIG. 5A are not positioned in the planar face 308a for maximum resolution. The seismic-data traces 302 illustrated in FIG. 5A therefore, represent a seismic-data image that is biased or distorted by the structure or formation that produced the seismic-data traces 302.

As illustrated in FIG. 3, the sampling probe 308 is positioned in a different area of the waveform volume 300 than the sampling probe 306 in order to analyze the reflection surface 304 in a different area of the waveform volume 300. If there is no reflection surface 304, either sampling probe 306, 308 may be positioned in the waveform volume 300 as needed to analyze the seismic-data traces 302 in a particular area for possible reflection surfaces representing one or more horizons.

In step 222, the method 200 determines whether the seismic data within the sampling probe and/or intersecting the sampling probe includes a predetermined reflection surface using techniques well known in the art. If a predetermined reflection surface is not present, then a reflection surface is calculated for the seismic data within the sampling probe and/or intersecting the sampling probe at step 222a using the local dip and/or azimuth for each seismic-data trace within the sampling probe and/or intersecting the sampling probe. Depending on whether the sampling probe is two-dimensional or three-dimensional, the local dip (2D) or the dip and azimuth (3D) may be required at step 222a. The local dip and azimuth information is compiled at step 214 and processed during steps 216, 216a, 218, and/or 218a until the local dip and azimuth units are confirmed to be, or are converted to, depth units. If, however, a predetermined reflection surface is present, like the reflection surface 304 illustrated in FIG. 5A and FIG. 5B, then the method 200 proceeds to step 224.

In step 224, seismic data within the sampling probe and/or intersecting the sampling probe that are perpendicular to a predetermined reflection surface or the reflection surface calculated in step 222a which is closest to a center of the sampling probe are extracted. The seismic data are extracted using local dip and/or azimuth information for each seismic-data trace. If, for example, the seismic data within the sampling probe and/or intersecting the sampling probe includes a predetermined reflection surface, then the local dip and/or azimuth for each seismic-data trace intersecting the predetermined reflection surface may be directly calculated, using techniques well known in the art, and used to calculate a normal incidence direction for each seismic-data trace relative to the predetermined reflection surface. If, however, the seismic data within the sampling probe and/or intersecting the sampling probe do not include a predetermined reflection surface, then the local dip and/or azimuth for each seismic-data trace scanned in step 214 and ultimately used to calculate the reflection surface in step 222a may be used to calculate the normal incidence direction for each seismic-data trace relative to the reflection surface that is calculated. Once the normal incidence direction for each seismic-data trace relative to the reflection surface (predetermined or calculated) is known, the seismic data within the sampling probe and/or intersecting the sampling probe that are perpendicular to the reflection surface which is closest to a center of the sampling probe may be extracted using techniques well know in the art. The following techniques are exemplary well known methods for calculating the normal incidence direction for each seismic-data trace relative to a predetermined reflection surface or a calculated reflection surface and extracting the same.

Figure 7:
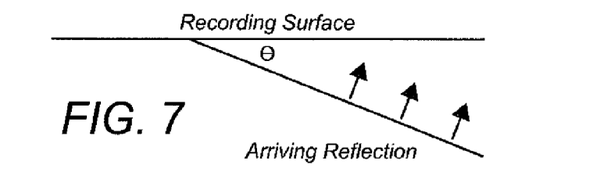
FIG. 7 illustrates an arriving reflection wavefield relative to a recording surface.

A preferred method for calculating the normal incidence direction for seismic-data traces in an unmigrated two-dimensional seismic data image at which to extract interpolated samples for the sampling probe display (enhanced image) is illustrated by FIG. 7. Let the center of the sampling probe be at trace M and time sample N. Denote the spacing between adjacent traces by Δx meters and the time sampling increment by Δt milliseconds. Assume that the reflection event slope at the sampling probe center is p milliseconds per trace and denote the surface velocity by v meters per second. Snell's law gives the relation:

$$\sin \theta = pv/(2000\Delta x) \quad 1)$$

for the surface arrival angle of the reflection event. In the subsurface, the vertical equivalent of Δt is given by Δz=2000 Δt/v meters. Sample the arriving reflection wavefield in the direction normal to the wavefront, i.e. in the direction of the arrows in FIG. 7, in increments of Δz and sample the reflection wavefield parallel to the wavefront in increments of Δx. This sampling ensures that the extracted seismic-data traces have the same trace and time sample spacings as the original unmigrated two-dimensional seismic data image. Moving one step in the normal direction requires a shift of sin θ traces to the right and cos θ time samples up. Moving one step in the parallel direction requires a shift of cos θ traces to the right and sin θ time samples up. Thus, the locations at which to interpolate within the unmigrated seismic-data image in order to extract and populate the sampling probe display are given by:

$$\text{trace number: } M+i \cos \theta + j \sin \theta \quad 2)$$

$$\text{trace sample: } N-i \sin \theta + j \cos \theta \quad 3)$$

where the horizontal trace index i and the vertical sample index j are both zero at the center of the sampling probe display.

For time migrated data, the situation is very similar with the exception that Snell's law now becomes:

$$\tan \theta = pv/(2000\Delta x) \quad 4)$$

Here v is given by a migration velocity at the sampling probe location rather than the surface velocity.

For depth migrated data, time becomes depth and the sampling for both the horizontal Δx and vertical Δz axes of the seismic-data traces is in units of meters. If the reflection slope p is measured in samples per trace, then:

$$\tan \theta = p\Delta z/\Delta x \quad 5)$$

directly and no velocity is needed to calculate sin θ and cos θ.

For a three-dimensional seismic-data image, let φ be the azimuth in which the reflection surface is dipping most steeply and $M_1$ and $M_2$ be the inline and crossline trace numbers of the sampling probe location. Then the above two-dimensional calculations for θ still hold true. Thus, p is measured along that azimuth and the corresponding samples to be extracted from the volume to form a stratigraphic sampling probe display (enhanced image) along that azimuth are:

$$\text{trace inline: } M_1+(i \cos \theta + j \sin \theta)\cos \phi \quad 6)$$

$$\text{trace crossline: } M_2+(i \cos \theta + j \sin \theta)\sin \phi \quad 7)$$

$$\text{time sample: } N-i \sin \theta + j \cos \theta \quad 8)$$

If a perpendicular sampling probe face is available for display, then the samples for it are found with cos φ and sin φ interchanged in equations 6-8.

Figure 6:
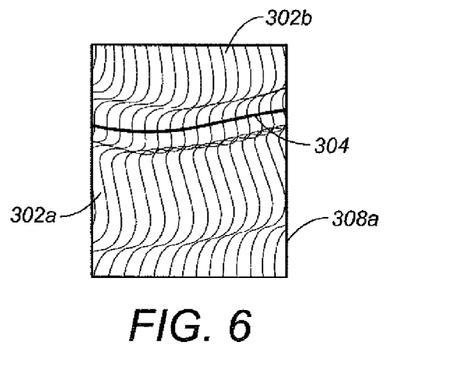
FIG. 6 is an enhanced image of the seismic data image illustrated in FIG. 5A.

In FIG. 6, the seismic-data traces 302a, 302b are perpendicular to the reflection surface 304. Because the sampling probe 308 illustrated in FIG. 3 is three-dimensional, the predetermined reflection surface 304, which is closest to the center 502 of the sampling probe 308, may be positioned substantially in a plane perpendicular to the visible planar faces of the sampling probe 308 as partially illustrated by FIG. 6. In other words, the predetermined reflection surface 304 is reoriented to correspond with a plane substantially perpendicular to the visible planar face 308a. Steps 226 and 228 are therefore, illustrated by the exemplary display of the enhanced image and the predetermined reflection surface 304 on the planar face 308a of the sampling probe 308 in FIG. 6.

In FIG. 5C, an image 308c illustrates the seismic-data traces 302a and 302b that intersect the face 308a and the predetermined reflection surface 304 illustrated in FIG. 5A. The image 308c is an exemplary display of the seismic data that are extracted during step 224, which are perpendicular to the predetermined reflection surface 304 that is closest to a center 502 of the sampling probe 308. The seismic-data traces 302a extend in front of face 308a and the seismic-data traces 302b extend behind the face 308a. The seismic data extracted in the image 308c is therefore, not visible in FIG. 5A, which illustrates a seismic data image comprising seismic data traces 302 intersecting only the visible planar face 308a of the sampling probe 308. The rest of step 224 is completed by positioning the extracted seismic data from the image 308c in the visible planar face 308a, which is illustrated in FIG. 6 and produces an enhanced image of the seismic data image illustrated in FIG. 5A. The seismic-data traces 302a, 302b are therefore, brought into the plane of the planar face 308a to maximum the resolution of the seismic data image illustrated in FIG. 5A.

According to step 224, the extracted seismic data are then positioned in the visible planar face(s) of a two-dimensional or three-dimensional sampling probe to form an enhanced image of the seismic data image. For example, a normal incidence direction of the predetermined reflection surface or the reflection surface calculated at step 222a may be reoriented to correspond with a plane substantially parallel to the visible planar face(s) of the sampling probe.

In step 226, the predetermined reflection surface or the reflection surface calculated at step 222a, which is closest to the center of the sampling probe, may be positioned substantially in a plane perpendicular to the visible planar faces of a three-dimensional sampling probe. For example, the predetermined reflection surface or the reflection surface calculated at step 222a may be reoriented to correspond with a plane substantially perpendicular to the visible planar faces of a three-dimensional sampling probe.

In step 228, the enhanced image, including any predetermined reflection surface or the reflection surface calculated at step 222a, may be displayed on the visible planar face(s) of the sampling probe.

In step 230, the enhanced image may be optionally displayed with or without a predetermined reflection surface or the reflection surface calculated at step 222a in a separate display window for unbiased stratigraphic analysis and comparison using the graphical user interface tools (menu/interface software 104) described in reference to FIG. 1. For example, a separate display window may be desired to compare the enhanced image with another enhanced image of a calculated reflection surface and/or the initial seismic data image for consistency. Likewise, multiple sampling probes may be used for comparison of enhanced images as illustrated in FIG. 3.

In step 234, the method 200 may be repeated at step 210 or step 220 if the sampling probe is repositioned.

Figure 2B:
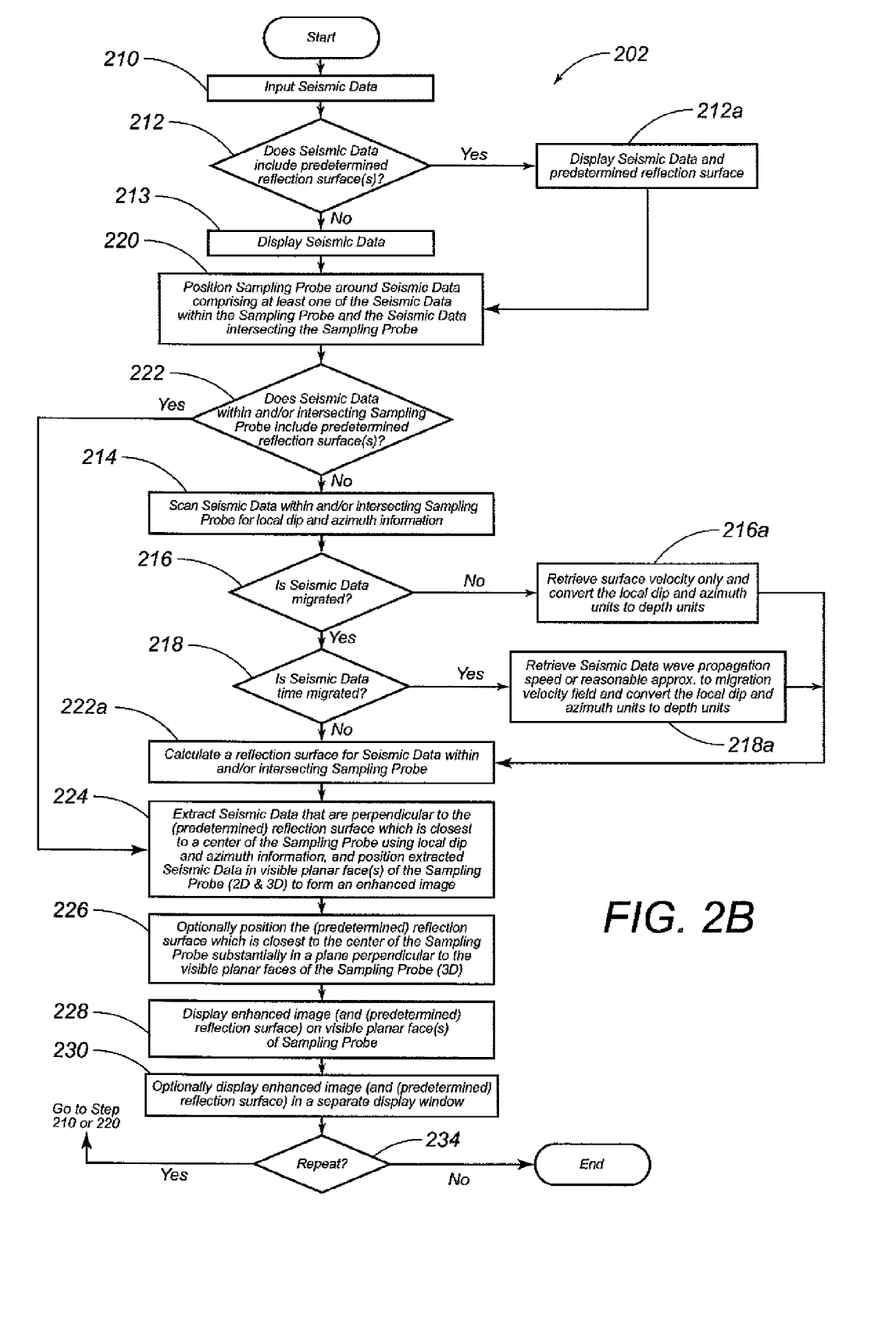
FIG. 2B is a flow diagram illustrating another embodiment of a method for implementing the present invention.

Referring now to FIG. 2B, another embodiment of a method 202 for implementing the present invention is illustrated. The method 202 illustrated in FIG. 2B contains the same steps as the method 200 illustrated in FIG. 2A except that certain steps have been reordered to emphasize that the present invention is not limited to any particular order among or between the various steps disclosed herein.

Present invention improves the ability to recognize and process amplitude variation patterns, and other attribute anomalies, indicative of hydrocarbon resources. Because the systems and methods described herein may be used to selectively and interactively analyze various types of seismic-data traces, they may be particularly useful for analyzing medical data or geophysical data, however, may also find utility for analyzing and interpreting any other type of waveform data.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for enhancing the resolution of a seismic-data image, comprising:
    positioning a sampling probe around seismic data, the seismic data comprising at least one of the seismic data within the sampling probe and the seismic data intersecting the sampling probe;
    extracting with a processor only the seismic data that are perpendicular to a reflection surface that is closest to a center of the sampling probe;
    repositioning at least a portion of the extracted seismic data in a visible planar face of the sampling probe to form an enhanced image of the seismic data image; and
    displaying the enhanced image.

2. The method of claim 1, wherein the seismic data comprise seismic data traces, each seismic data trace comprising information confirming at least one of its local dip and its local azimuth.

3. The method of claim 2, wherein extracting the seismic data that are perpendicular to the reflection surface comprises calculating a normal incidence direction for each seismic data trace relative to the reflection surface.

4. The method of claim 3, wherein the reflection surface is predetermined and is used for calculating the normal incidence direction for each seismic data trace relative to the reflection surface.

5. The method of claim 3, wherein at least one of the local dip and the local azimuth for each seismic data trace within the seismic data are used for calculating the reflection surface and the normal incidence direction for each seismic data trace relative to the reflection surface.

6. The method of claim 1, wherein repositioning the at least a portion of the extracted seismic data in the visible planar face of the sampling probe comprises reorienting a normal incidence direction of the reflection surface to correspond with a plane substantially parallel to the visible planar face.

7. The method of claim 6, further comprising reorienting the reflection surface to correspond with a plane substantially perpendicular to the visible planar face and another visible planar face of the sampling probe.

8. The method of claim 1, further comprising displaying the seismic data before positioning the sampling probe.

9. The method of claim 8, wherein the displayed seismic data comprises a predetermined interpretation of a surface representing the reflection surface.

10. The method of claim 1, further comprising displaying the enhanced image in a separate display window for analysis or comparison with the seismic data image.

11. The method of claim 1, wherein the enhanced image represents a maximum resolution of a portion of the seismic data.

12. The method of claim 1, wherein the seismic data image comprises the seismic data intersecting only the visible planar face of the sampling probe.

13. A computer readable medium having computer executable instructions for enhancing the resolution of a seismic-data image, the instructions being executable to implement:

positioning a sampling probe around seismic data, the seismic data comprising at least of the seismic data within the sampling probe and the seismic data intersecting the sampling probe;

extracting only the seismic data that are perpendicular to a reflection surface that is closest to a center of the sampling probe;

repositioning at least a portion of the extracted seismic data in a visible planar face of the sampling probe to form an enhanced image of the seismic data image; and displaying the enhanced image.

14. The computer readable medium of claim 13, wherein the seismic data comprise seismic data traces, each seismic data trace comprising information confirming at least one of its local dip and its local azimuth.

15. The computer readable medium of claim 14, wherein extracting the seismic data that are perpendicular to the reflection surface comprises calculating a normal incidence direction for each seismic data trace relative to the reflection surface.

16. The computer readable medium of claim 15, where the reflection surface is predetermined and is used for calculating the normal incidence direction for each seismic data trace relative to the reflection surface.

17. The computer readable medium of claim 15, wherein at least one of the local dip and the local azimuth for each seismic data trace within the seismic data are used for calculating the reflection surface and the normal incidence direction for each seismic data trace relative to the reflection surface.

18. The computer readable medium of claim 13, wherein repositioning the at least a portion of the extracted seismic data in the visible planar face of the sampling probe comprises reorienting a normal incidence direction of the reflection surface to correspond with a plane substantially parallel to the visible planar face.

19. The computer readable medium of claim 18, further comprising reorienting the reflection surface to correspond with a plane substantially perpendicular to the visible planar face and another visible planar face of the sampling probe.

20. The computer readable medium of claim 13, further comprising displaying the seismic data before positioning the sampling probe.

21. The computer readable medium of claim 20, wherein the displayed seismic data comprises a predetermined interpretation of a surface representing the reflection surface.

22. The computer readable medium of claim 13, further comprising displaying the enhanced image in a separate display window for analysis or comparison with the seismic data image.

23. The computer readable medium of claim 13, wherein the enhanced image represents a maximum resolution of a portion of the seismic data.

24. The computer readable medium of claim 13, wherein the seismic data image comprises the seismic data intersecting only the visible planar face of the sampling probe.

* * * * *

UNITED STATES PATENT AND TRADEMARK OFFICE
CERTIFICATE OF CORRECTION

PATENT NO.        : 7,702,463 B2                                      Page 1 of 1
APPLICATION NO.   : 11/954596
DATED             : April 20, 2010
INVENTOR(S)       : Stewart A. Levin It is certified that error appears in the above-identified patent and that said Letters Patent is hereby corrected as shown below:

Claim 13, column 15, line 5 should read "...at least one of the seismic data..."

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,702,463 B2
APPLICATION NO. : 11/954596
DATED : April 20, 2010
INVENTOR(S) : Stewart A. Levin It is certified that error appears in the above-identified patent and that said Letters Patent is hereby corrected as shown below:

Title Page, Item (73) Assignee: -- after "Assignee: Landmark Graphics Corporation" remove ", a Halliburton company" --

Signed and Sealed this
Sixth Day of November, 2012

David J. Kappos
*Director of the United States Patent and Trademark Office*